United States Patent [19]
Minichan et al.

[11] Patent Number: 5,190,333
[45] Date of Patent: Mar. 2, 1993

[54] GRIPPER DEPLOYING AND INVERTING LINKAGE

[76] Inventors: Richard L. Minichan, 23 Pineview Dr., Warrenville, S.C. 29851; Mark A. Killian, 102 Foxhunt Dr., North Augusta, S.C. 29841

[21] Appl. No.: 681,294
[22] Filed: Apr. 8, 1991
[51] Int. Cl.⁵ .............................. G21C 19/26
[52] U.S. Cl. .................... 294/86.41; 294/88; 414/783
[58] Field of Search .............. 294/86.41, 88; 901/30, 901/31; 414/754, 758, 772, 783, 917

[56] References Cited

U.S. PATENT DOCUMENTS

| | | | |
|---|---|---|---|
| 2,131,869 | 10/1938 | Burrell | 294/65 |
| 2,765,930 | 10/1956 | Greer et al. | 214/1 |
| 2,807,373 | 9/1957 | Couser | 212/42 |
| 2,861,699 | 11/1958 | Youmans | 214/1 |
| 3,734,556 | 5/1973 | Misawa | 294/88 |
| 3,773,189 | 11/1973 | Kitamura et al. | 214/1 BB |
| 4,141,457 | 2/1979 | Nocek | 414/783 X |
| 4,154,470 | 5/1979 | Dalglish | 294/86.41 X |
| 4,243,257 | 1/1981 | Shackleford | 294/88 |
| 4,368,913 | 1/1983 | Brockmann et al. | 294/106 |
| 4,759,674 | 7/1988 | Schroder et al. | 294/86.41 X |
| 4,891,889 | 1/1990 | Tomelleri | 414/917 X |
| 4,958,981 | 9/1990 | Uchihashi | 294/86.41 X |
| 5,011,206 | 4/1991 | Guironnet | 294/86.41 |

Primary Examiner—Charles A. Marmor
Assistant Examiner—Joseph D. Pape
Attorney, Agent, or Firm—Harold M. Dixon; William R. Moser; Richard E. Constant

[57] ABSTRACT

An end effector deploying and inverting linkage. The linkage comprises an air cylinder mounted in a frame or tube, a sliding bracket next to the air cylinder, a stopping bracket depending from the frame and three, pivotally-attached links that are attached to the end effector and to each other in such a way as to be capable of inverting the end effector and translating it laterally. The first of the three links is a straight element that is moved up and down by the shaft of the air cylinder. The second link is attached at one end to the stopping bracket and to the side of the end effector at the other end. The first link is attached near the middle of the second, sharply angled link so that, as the shaft of the air cylinder moves up and down, the second link rotates about an axis perpendicular to the frame and inverts and translates the end effector. The rotation of the second link is stopped at both ends when the link engages stops on the stopping bracket. The third link, slightly angled, is attached to the sliding bracket at one end and to the end of the end effector at the other. The third helps to control the end effector in its motion.

13 Claims, 2 Drawing Sheets

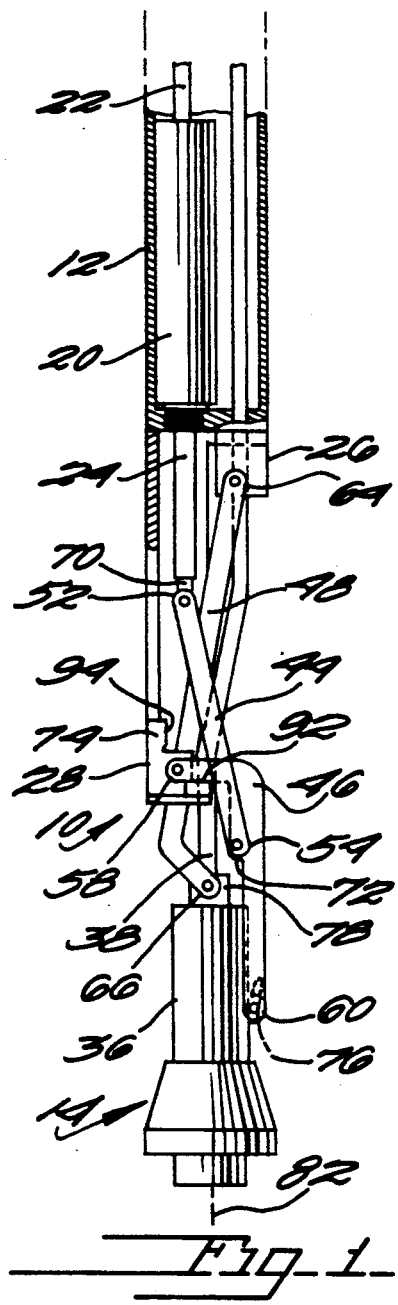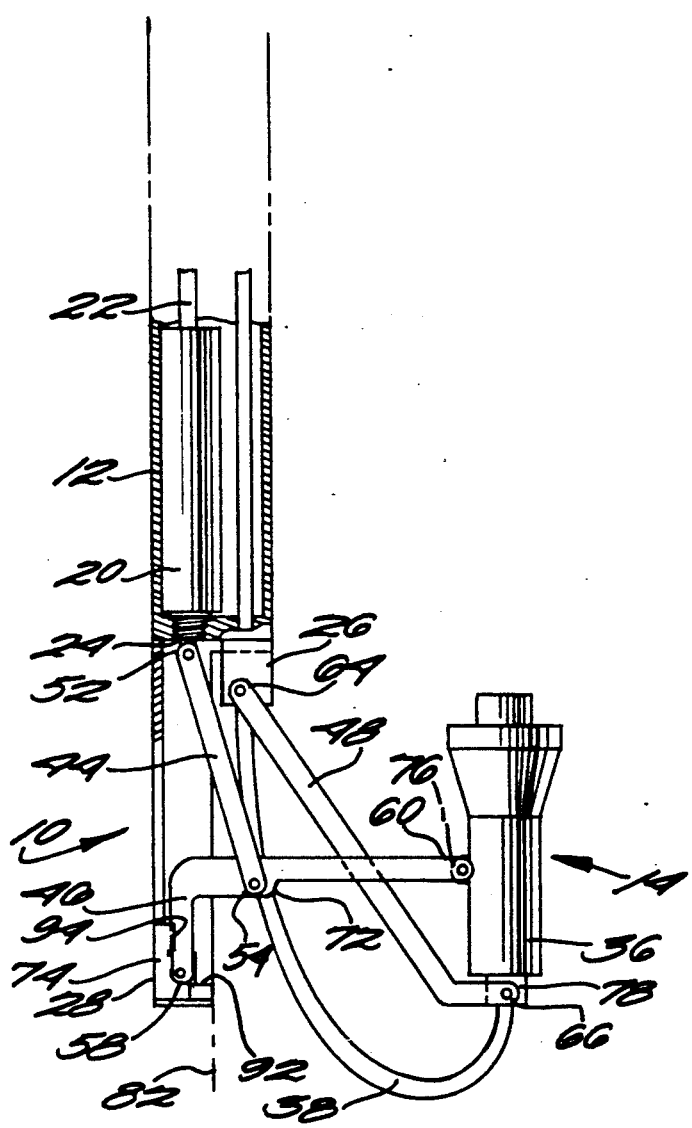

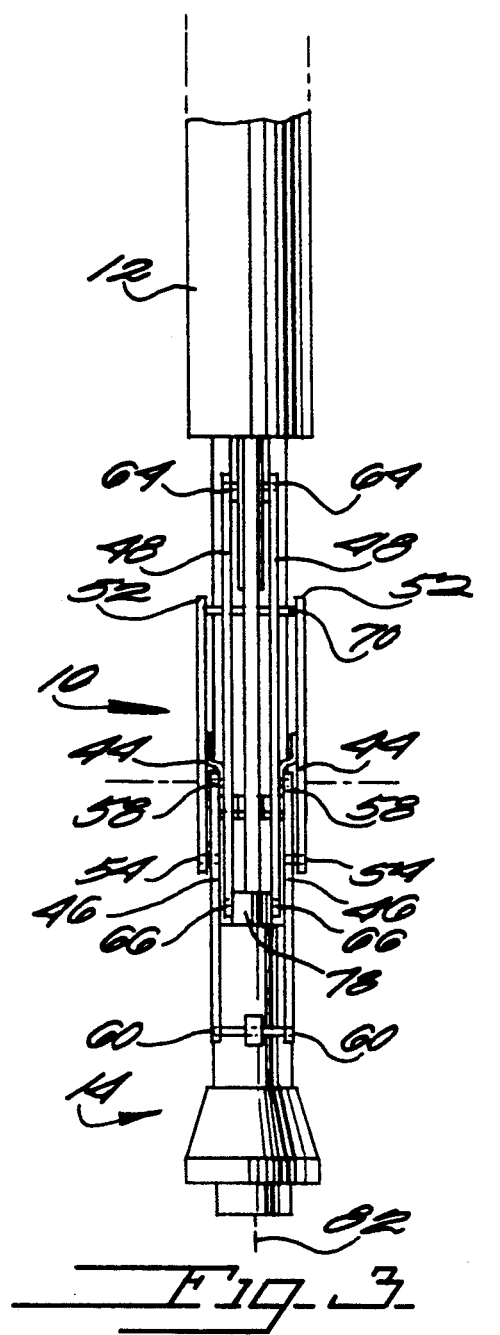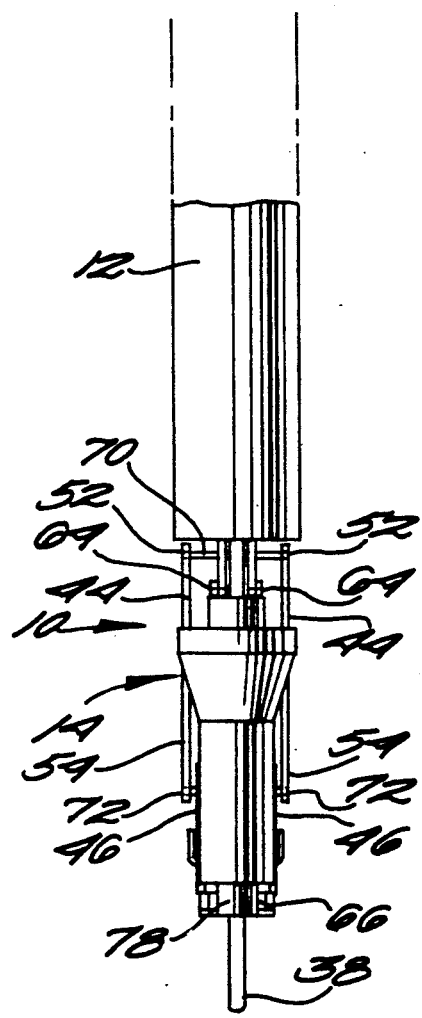

GRIPPER DEPLOYING AND INVERTING LINKAGE

The U.S. Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to mechanical linkages for positioning an end effector such as a gripper.

2. Discussion of Background

An "end effector" is a tool or device designed for a particular function and operated from the end of a deploying or positioning handle. End effectors include gripping devices of all sorts, whether designed to grip one or more tools that perform an operation on a workpiece or to grip the workpiece itself and to move it or simply hold it while a second operation takes place with another tool.

Frequently, end effectors are designed so that they can be operated not only in line with a handle but also at an angle with respect to the handle. If the end effector can not be fixed at the particular angle needed, or if the angle varies from one operation to the next, the end effector and the handle may be interconnected by mechanical or electro-mechanical linkages so that the end effector can be positioned or rotated or turned as desired while the handle remains fixed. A linkage is composed of one or more links interconnected so as to cooperate with each other in the achievement of some motion of an end effector.

There are many examples of linkages that will allow flexibility in the coupling of the end effector to the handle, from robotic arms and servo-mechanical manipulators to socket wrenches. In particular, see Shackleford's gripper mechanism described in U.S. Pat. No. 4,243,257 and Greer, et al.'s material handling manipulator described in U.S. Pat. No. 2,765,930. Shackleford's device has an air cylinder that moves one of two links, the links pivotally interconnected, so that jaws operated from the links open and close. Greer's device is also a gripper, opening and closing by the manipulation of a hand grip separated from the gripper by a flexible hose so that the gripping operation can take place at large angles with respect to the hand grip.

In particular, there are linkage mechanisms that invert an object. See the mechanisms of Kitamura, et al. in U.S. Pat. No. 3,773,189, Misawa in U.S. Pat. No. 3,734,556, Youmans in U.S. Pat. No. 2,861,699, and Couser in U.S. Pat. No. 2,807,373. However, all of these rotate the object to invert it. It is sometimes necessary to grip an object from the end and turn it 180° or more and hold it. There is a need for a mechanical linkage that deploys a gripper or other end effector and inverts it for application to a workpiece, especially a linkage that is compact so that it performs the inverting in a minimum of space.

SUMMARY OF THE INVENTION

According to its major aspects and broadly stated, the present invention is a mechanical linkage for use with an end effector, such as a gripper. The linkage comprises a frame with a first axis and means for rotating the end effector about a second axis that is perpendicular to the first axis and translating the end effector, so that the end effector is inverted from its original position and moved laterally.

In particular, the linkage includes a frame with an actuator such as an air cylinder attached to it that slides a shaft or rod between a first position, when the end effector is hanging vertically, and a second position, when the end effector has been inverted and translated. There is a stationary bracket also on the frame, next to the air cylinder. One end of the first of three links that make up the heart of the linkage is pivotally attached to the rod. The other end of the first link is attached to about the middle of the second link. One end of the second link is attached to the side of the end effector and the other to a stopping bracket. The stopping bracket, attached to said frame, has two faces, perpendicular to each other, that engage the sides of the second link to stop its rotation. The third link is attached at one end to a stationary bracket mounted to the frame. The other end of the third link is attached to the end of the end effector.

The first link, moved by the rod of the air cylinder, causes the second link to rotate about an axis perpendicular to the axis of the frame. The stopping bracket limits the rotation at both extremes of motion, corresponding to the first and second positions of the end effector. The third link helps to control the end effector which would otherwise be attached, pivotally, to only the second link of the linkage. The third link prevents the end effector from pivoting about the end of the second link when moving or when stationary.

The configuration and cooperation of the linkage is a major feature of the present invention because it not only inverts an end effector but it does so in a very compact package. The links, frame and end effector can fit through a small hole and then invert and translate the end effector laterally.

Another feature of the present invention is that it operates on one actuator, such as an air cylinder. The links and brackets are configured so that the shaft of the single cylinder will cause the inversion and translation, yet control and precisely position the end effector. The advantage of this feature is that it minimizes power requirements and reduces the number of air hoses and wires required. This advantage is especially important since the end effector will likely have its own air cylinder or other actuator and may well have more than one.

Still another feature of the present invention is the fact that the inversion and translation are accomplished with three, simple, mechanical links and one air cylinder. Mechanical linkages can withstand stresses and strains that other types of motion producing systems cannot; they are rugged and relatively impervious to electro-magnetic noise, impact, heat, cold, radiation, and chemical attack.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a side view of a linkage according to a preferred embodiment of the present invention with the end effector in the in-line position;

FIG. 2 is another side view of the linkage of FIG. 1 showing the end effector in an inverted position;

FIG. 3 is a front view of the linkage of FIG. 1; and

FIG. 4 is a front view of the linkage of FIG. 2.

DETAILED DESCRIPTION OF A PREFERRED EMBODIMENT

Referring now to FIG. 1, there is illustrated a linkage in one environment of use. The linkage, indicated by the reference numeral 10 is attached to a tube 12 that serves as a frame to which linkage 10 can be mounted and positioned in the general vicinity of need. Depending from linkage 10 is an end effector, such as a gripper 14.

Within tube 12 is an actuator such as an air cylinder 20 with an air hose 22 and a shaft or rod 24 moved by the injection of and release of air from air cylinder 20. Adjacent to air cylinder 20, on one side is stationary bracket 26; on the other side is a stopping bracket 28, the functions of which will be explained presently.

Gripper 14 is illustrated as being operated by its own air cylinder 36 supplied by a separate air hose 38. However, other end effectors manipulated by other means may be deployed by linkage 10 equivalently.

Linkage 10 has three links: a first link 44, a second link 46, and a third link 48. First link 44 has a first end 52 and a second end 54. Second link 46 has a first end 58 and a second end 60. Third link 48 has a first end 64 and a second end 66.

As will be seen by comparing FIGS. 1 and 3, each link is doubled, in the preferred embodiment, for equalization of forces and stresses.

First end 52 of first link 44 is pivotally attached to a bar 70 that is attached to rod 24. Second end 54 of first link 44 is pivotally attached to second link 46 at a point 72 between first end 58 and second end 60 of second link 46. First end 58 of second link 46 is pivotally attached to a stop 74 on the end of stopping bracket 28. Second end 60 of second link 46 is pivotally attached to the side of gripper 14 at 76.

First end 64 of third link 48 is pivotally attached to stationary bracket 26, and second end 66 of third link 48 is pivotally attached to the end of gripper 14 at 78.

When linkage 10 is holding gripper 14 in line with an axis 82, the arrangement presents a compact, small diameter device, suitable for inserting in narrow channels. In FIGS. 2 and 4, however, gripper 14 has been rotated about a second axis 84 perpendicular to axis 82 to invert gripper 14. The inversion is achieved by the pulling of rod 24 which in turn pulls first link 44. First link 44 pulls at 72 on second link 46 causing it to rotate about its first end 58. Third link 48 moves with gripper 14 and acts to prevent gripper 14 from swinging about second end 60 of second link 46 at 76 where it meets gripper 14. Third link 48 therefore serves a stabilizing function.

Second link 46 affects the amount and direction of rotation of gripper 14. Second link 46 has a right angle bend as illustrated which divides the 180° required for the inversion into two 90° portions. The first portion is achieved by first end 58 of second link 46 as it moves from engagement with a first face 92 of stop 74 to a second face 94 90° from first face 92. Meanwhile, second end 60 of second link 46 pivots with respect to side 76 from parallel to perpendicular to complete the inversion.

It will be apparent to those skilled in the art that many changes and substitutions can be made to the preferred embodiment herein described without departing from the spirit and scope of the present invention. For example, the inversion does not have to be 180° but can be less or a little more depending on such factors as the angle between first and second faces 92, 94 and the length of first link 44. The end effector can be a gripper, as referred to in the present description, or some other tool or manipulator or operative device such as a welding torch. Similarly, air cylinder 20 could be replaced by an hydraulic cylinder or electro-mechanical device, so long as it is capable of controlled motion of rod 24. The invention is, therefore, to be defined by the appended claims.

What is claimed is:

1. A mechanical linkage for use with an end effector, said linkage comprising:
   a frame having a first axis;
   a rod;
   actuating means attached to said frame for moving said rod between a first and a second position, said end effector in line with said frame when said rod is in said first position and inverted when said rod is in said second position;
   a stationary bracket slidably mounted to said frame;
   a first link having a first end and a second end, said first end pivotally attached to said rod;
   a second link having a first end and a second end, said second end of said second link pivotally attached to said end effector, said second end of said first link attached to said second link so that said first link can rotate said second link when said rod moves between said first position and said second position;
   a third link having a first end and a second end, said first end of said third link pivotally attached to said stationary bracket and said second end of said third link pivotally attached to said end effector; and
   means for stopping said second link when said rod is at said first or said second positions.

2. The linkage as recited in claim 1, wherein said stopping means further comprises a stopping bracket attached to said frame, said stopping bracket having a first face and a second face, said second link engaging said first face when said rod is in said first position, said second link engaging said second face when said rod is in said second position.

3. The linkage as recited in claim 2, wherein said first end of said second link is pivotally attached to said stopping bracket.

4. The linkage as recited in claim 1, wherein said actuating means is an air cylinder.

5. An apparatus for operating on a workpiece, comprising:
   a frame;
   an end effector for engaging said workpiece;
   a rod;
   actuating means attached to said frame for moving said rod between a first and a second position, said end effector in line with said frame when said rod is in said first position and inverted when said rod is in said second position;
   a stationary bracket slidably mounted to said frame;
   a first link having a first end and a second end, said first end pivotally attached to said rod;
   a second link having a first end and a second end, said second end of said second link pivotally attached to said end effector, said second end of said first link attached to said second link so that said first link can rotate said second link when said rod moves between said first position and said second position;
   a third link having a first end and a second end, said first end of said third link pivotally attached to said stationary bracket and said second end of said third link pivotally attached to said end effector; and means for stopping said second link when said rod is at said first or said second positions.

6. The apparatus as recited in claim 5, wherein said stopping means further comprises a stopping bracket attached to said frame, said stopping bracket having a first face and a second face, said second link engaging said first face when said rod is in said first position, said second link engaging said second face when said rod is in said second position.

7. The apparatus as recited in claim 6, wherein said first end of said second link is pivotally attached to said stopping bracket.

8. The apparatus as recited in claim 5, wherein said actuating means is an air cylinder.

9. An apparatus for operating on a workpiece, comprising:
 a frame;
 an end effector, having a first end, a second end and a side;
 a rod;
 actuating means attached to said frame for moving said rod between a first and a second position, said end effector in line with said frame when said rod is in said first position and inverted and translated when said rod is in said second position;
 a stationary bracket slidably mounted to said frame;
 a first link having a first end and a second end, said first end pivotally attached to said rod;
 a second link having a first end and a second end, said first end of said second link pivotally attached to said end effector, said second end of said first link attached to said second link so that said first link can rotate said second link when said rod moves between said first position and said second position;
 a third link having a first end and a second end, said first end of said third link pivotally attached to said stationary bracket and said second end of said third link pivotally attached to said end effector; and
 means for stopping said second link when said rod is at said first or said second positions.

10. The apparatus as recited in claim 9, wherein said second end of said end effector engages said workpiece, said first end of said end effector is pivotally attached to said second end of said third link, said second end of said second link is pivotally attached to said side of end effector.

11. The apparatus as recited in claim 9, wherein said stopping means further comprises a stopping bracket attached to said frame, said stopping bracket having a first face and a second face, said second link engaging said first face when said rod is in said first position, said second link engaging said second face when said rod is in second position.

12. The apparatus as recited in claim 11, wherein said first end of said second link is pivotally attached to said stopping bracket.

13. The apparatus as recited in claim 9, wherein said actuating means is an air cylinder.

* * * * *